United States Patent [19]
Sakurai et al.

[11] Patent Number: 5,594,756
[45] Date of Patent: Jan. 14, 1997

[54] DECISION FEEDBACK EQUALIZATION CIRCUIT

[75] Inventors: Wataru Sakurai, Odawara; Hideki Sawaguchi, Kodaira; Naoki Satoh, Odawara; Masuo Umemoto, Tokyo, all of Japan

[73] Assignee: Hitachi, Ltd., Tokyo, Japan

[21] Appl. No.: 492,616

[22] Filed: Jun. 20, 1995

[30] Foreign Application Priority Data

Jun. 23, 1994 [JP] Japan .................................. 6-141407

[51] Int. Cl.⁶ ............................................. H03H 7/30
[52] U.S. Cl. .......................... 375/233; 375/346; 375/350; 364/724.16; 364/724.2
[58] Field of Search ..................................... 375/229, 232, 375/233, 346, 348, 349–350; 364/724.16, 724.17, 724.19, 724.2

[56] References Cited

U.S. PATENT DOCUMENTS

| | | | |
|---|---|---|---|
| 5,267,265 | 11/1993 | Mizoguchi | 375/233 |
| 5,367,536 | 11/1994 | Tsujimoto | 375/233 |
| 5,398,259 | 3/1995 | Tsujimoto | 375/233 |

OTHER PUBLICATIONS

IEEE Transactions on Magnetics, vol. 24, No. 1, Jan. 1988, "Decision Feedback Equalization for Magnetic Recording Systems", p. 683.
IEEE Transactions on Magnetics, vol. 26, No. 6, "Performance Comparison of Detection Methods in Magnetic Recording", Nov. 1990, pp. 3155–3172.

*Primary Examiner*—Stephen Chin
*Assistant Examiner*—Thuy L. Nguyen
*Attorney, Agent, or Firm*—Fay, Sharpe, Beall, Fagan, Minnich & McKee

[57] ABSTRACT

A decision feedback equalization circuit which can be operated at a high speed with a low cost as well as a high-speed digital data communication system and a high-speed digital data recording system using the equalization circuit are disclosed. The decision feedback equalization circuit has data memories which correspond to the number of available values in decision result and in which feedback signals corresponding to all the next decision results are previously prepared as candidates so that a suitable one of the feedback signal candidates is selected and fed back based on the obtained decision result, thus realizing high-speed operation of a feedback loop.

14 Claims, 17 Drawing Sheets

FIG. 17
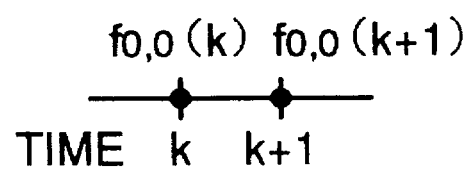
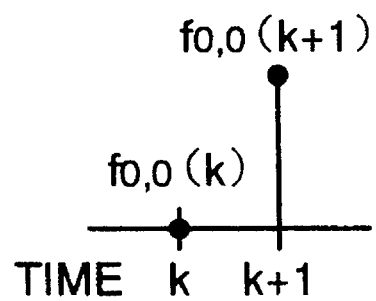
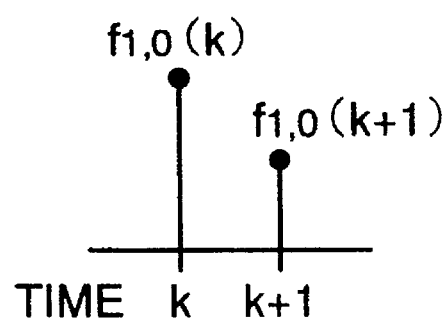
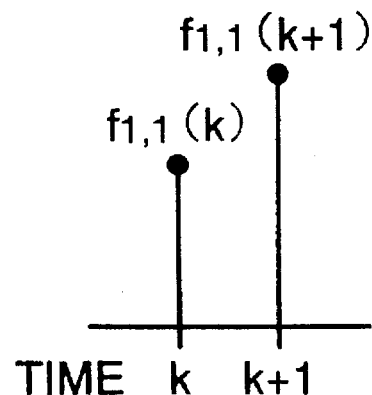

DECISION FEEDBACK EQUALIZATION CIRCUIT

FIELD OF THE INVENTION

The present invention relates to a waveform equalization system for a data transmission line which can be suitably used in a signal processing system for a magnetic disk apparatus.

BACKGROUND OF THE INVENTION

An arrangement of a prior art decision feedback equalization circuit will be explained in connection with FIG. 1.

In a digital signal transmission system, a signal received through a transmission line generally comprises a transmitted signal distorted by intersymbol interference and noise.

The received signal passed through a transmission system with a relatively narrow band as transmission band has such intersymbol interference that affects the previous and subsequent transmission bits. In this specification, such interference which affects bits of the received signal at times antecedent to a received bit will be referred to as the forward interference, while such interference which affects bits of the received signal at times subsequent to the received bit will be referred to as the backward interference.

Noise is a general term for random disturbances independent of signals. For the purpose of removing intersymbol interference from such a received signal, an equalization circuit is used, A decision feedback equalization circuit comprises a linear equalizer 2 for eliminating forward interference in bits of the received signal, an intersymbol interference estimator 80 for eliminating backward interference in the signal bits, a subtracter 4, and a detector 6.

Explanation will next be made as to the operational principle of the decision feedback equalization circuit by referring to FIG. 2. To simplify explanation, it is herein assumed that a received signal 1 received in the decision feedback equalization circuit is a digital data signal of levels "0" and "1" distorted by intersymbol interference and disturbance. It is further assumed that a transmitted signal 33 is an isolated impulse signal having a level "1" at a transmission time corresponding to a reception time k and a level "0" at the other times. The received signal 1 is first subjected at the linear equalizer 2 to removal of forward interference antecedent to the received time k. The received signal is then subjected at the subtracter 4 to subtraction of a feedback signal 9. The feedback signal 9 is an estimate of the backward interference from the currently received bit and the backward interference is removed by subtracting the backward interference estimate for the subsequent bits. Whether to perform the subtraction for removal of the backward interference for the subsequent bits is determined by a decision signal "0" or "1" of the detector 6. That is, when determining the presence of an impulse signal at the received time k, the detector 6 performs a backward interference removing operation over the subsequent bits; whereas, when determining the absence of an impulse signal, the detector 6 performs no backward interference removing operation. The detector 6 generates a detected signal 7 as its output result and applies it to the intersymbol interference estimator 80. An output 9 of the intersymbol interference estimator 80 corresponds to an estimate of the backward interference contained in a signal to be next received from the past received data sequence. The feedback signal 9 generated by the intersymbol interference estimator 80 is applied to a minus input of the subtracter 4 to remove the backward interference applied to the next-received signal. Thereafter, these operations are repeated. An example of such a decision feedback equalization circuit is described in, for example, Jan W. M. Bergmans, "Decision Feedback Equalization for Magnetic Recording Systems", IEEE Trans. Magn. pp. 683, Vol. 24, No. 1, January, 1988.

The timing of operation of the prior art decision feedback equalization circuit is shown in FIG. 3. A main clock period 24 is a period with which a received signal is applied to the decision feedback equalization circuit. It is impossible to set the main clock period 24 to be shorter than a time 25 corresponding to a total sum of a delay time 17 of the subtracter 4, a delay time 18 of the detector 6 and a delay time 19 of the intersymbol interference estimator 80.

In a digital data transmission field, a higher data transmission rate has been always demanded. When a decision feedback equalizer is used as an equalizing means, a decision result is used to estimate an interference and a negative feedback circuit is provided at an input of a decider or detector, which results in that it is impossible to set a data transmission period to be shorter than a delay time of the feedback circuit. Accordingly, for the purpose of shortening the delay time of the feedback circuit to increase the data transmission rate, elements constituted of the feedback circuit are required to be of a high speed type.

It is therefore an object of the present invention to provide an inexpensive, high-speed decision feedback equalization circuit in which a feedback circuit can be made fast in operation while eliminating the need for requiring all elements of the feedback circuit to be of a high speed type.

SUMMARY OF THE INVENTION

In accordance with the present invention, when it is first assumed that a detector has M possible outputs (M being an integer of 2 or more), there may be provided M subtracters for subtracting outputs of feedback-signal selection estimator means from a received signal, M data memories for holding therein outputs of the M subtracters, and a selector for selecting one of data held in the M data memories.

The above feedback-signal selection estimator means may comprise a single feedback-signal selection estimator.

The above feedback-signal selection estimator means may comprise M feedback-signal selection estimators.

In the prior art, when it is first assumed that a detector has M possible outputs, a decision at a time (t) causes determination of a feedback signal to the received signal at a next time (t+1) from acquisition of a decision output. However, in accordance with the present invention, when a decision result at a time (t−1) is obtained, M feedback signal candidates at the time (t) of obtaining the M decision results are previously prepared so that, when the decision result at the time (t) is obtained, one feedback signal corresponding to the decision result is selected from the M feedback signal candidates and fed back. This shortens the time taken from the decision to the feedback of the feedback signal over that of the prior art decision feedback equalization circuit.

In the decision feedback equalization circuit, it is impossible to make a signal input/output period shorter than the delay time of the feedback circuit. In the prior art decision feedback equalization circuit, the delay time of the feedback circuit corresponds to a sum of the delay time of the subtracters, the delay time of the detector and the delay time of the feedback-signal selection estimator.

The signal input/output period of the decision feedback equalization circuit in accordance with the present invention is required to be set larger than one of a sum of the delay time of the subtracter, the delay time of the detector, the delay time of the data memory and the delay time of the selector; or a time necessary for deciding the M feedback signal candidates.

Therefore, the signal input/output period of the decision feedback equalization circuit of the present invention can be set to be shorter than the signal input/output period of the prior art decision feedback equalization circuit; by a time of the shorter one of a time corresponding a subtraction of the delay times of the data memory and selector from a time necessary for the decision of the M feedback signal candidates, and a sum of the delay times of the subtracter and detector.

In accordance with the present invention, M feedback signal candidates corresponding to acquisition of M possible decision results at the time (t) are found at the time of obtaining a decision result at the time (t–1), M subtracters are used to previously prepare negative feedback results of the M feedback signal candidates, one of which is selected corresponding to the decision result obtained at the time (t) and applied to the detector. Thus, the time between 2 consecutive decisions of the decision feedback equalization circuit can be made shorter than that of the prior art decision feedback equalization circuit, by a time of the shorter one of a time corresponding to a subtraction of a sum of the delay times of the detector and intersymbol interference estimator from a sum of the delay times of the intersymbol interference estimator and subtracter, and a time corresponding to a subtraction of half of a sum of the delay times of the detector, intersymbol interference estimator, subtracter, data memory and selector from a sum of the delay times of the detector, intersymbol interference estimator and subtracter.

In accordance with the present invention, in place of the intersymbol interference estimator forming the feedback-signal selection estimator being made up of high-speed elements, the data memory and selector comprise high-speed elements, whereby the operation of the circuit can be made fast with a low cost.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 17 shows diagrams for explaining received signals without noise; and

DESCRIPTION OF THE PREFERRED EMBODIMENTS

Figure 1:
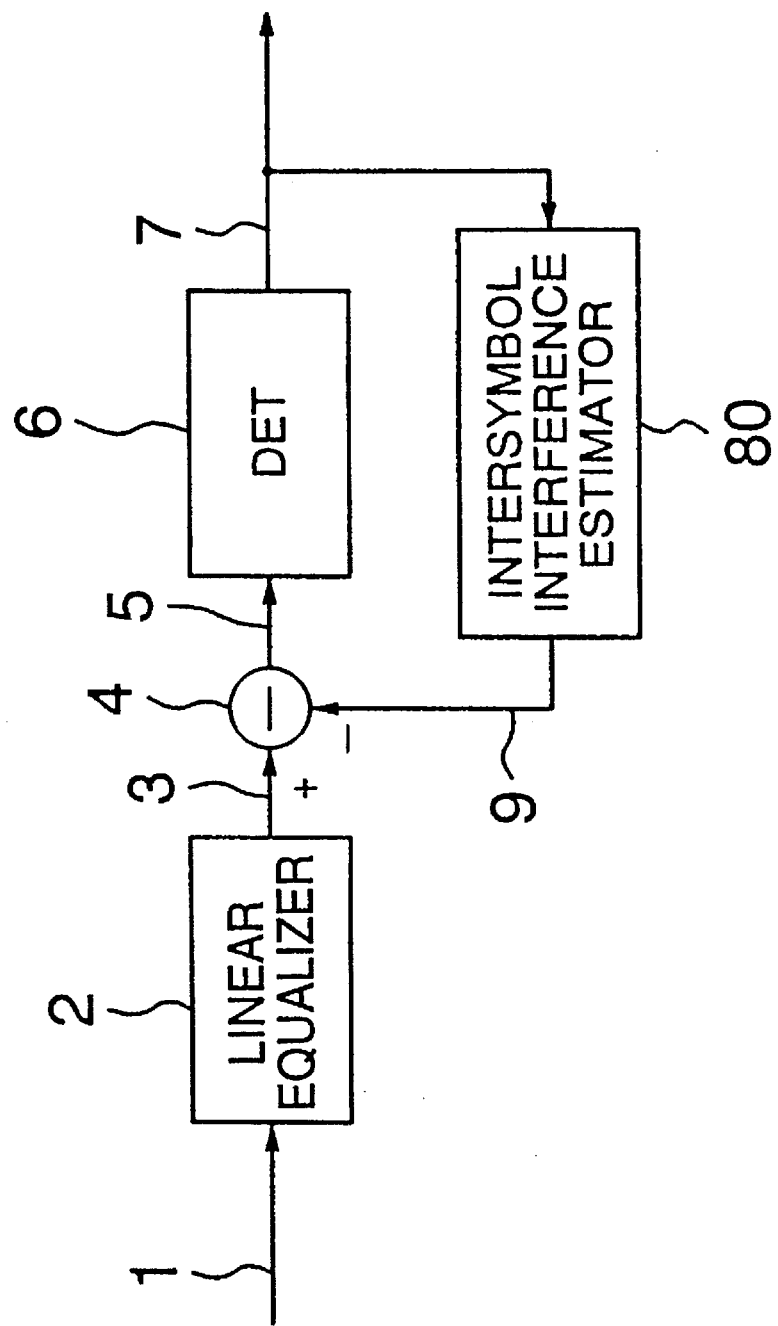
FIG. 1 is an arrangement of a prior art decision feedback equalization circuit.
Figure 2:
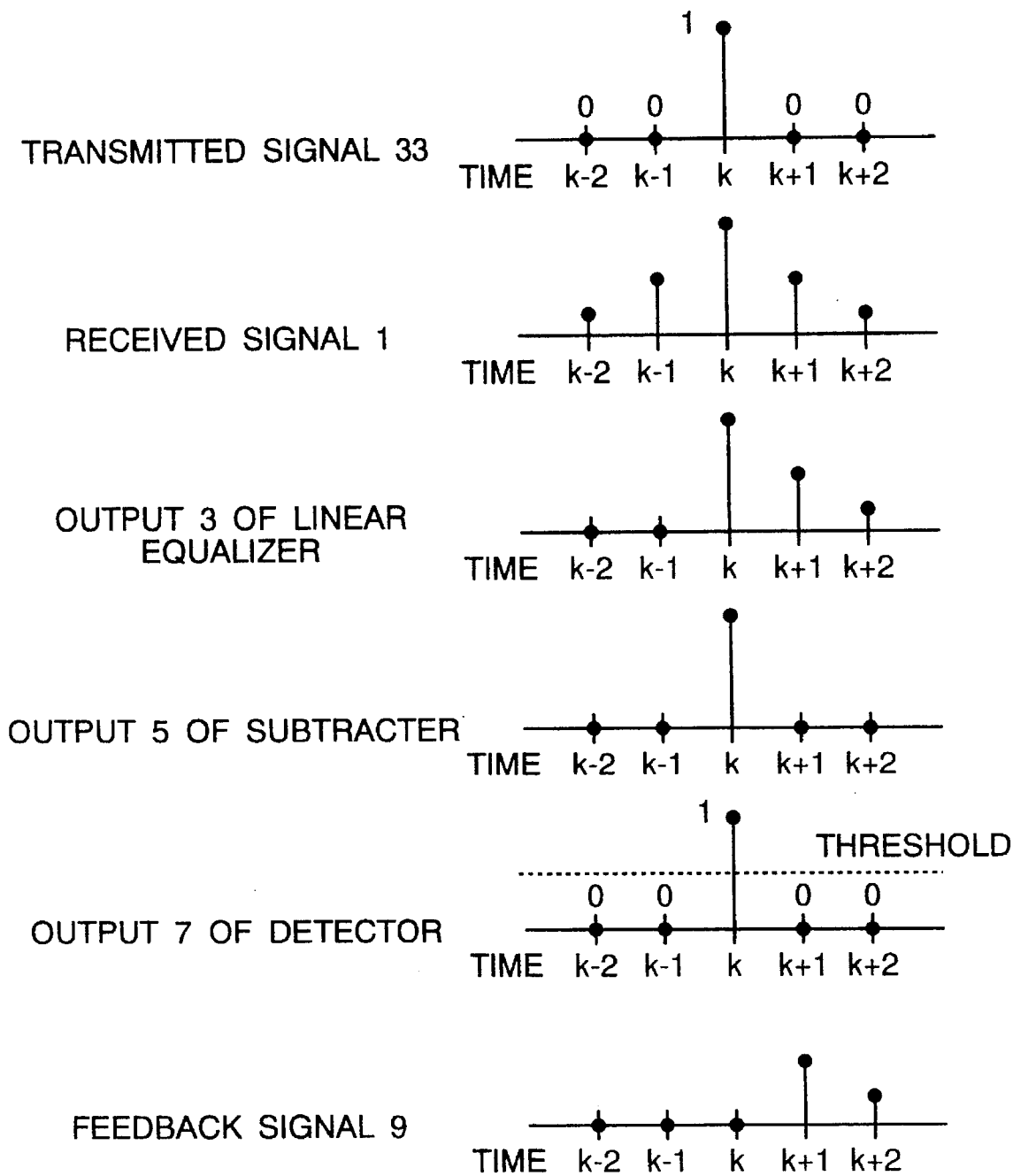
FIG. 2 shows diagrams for explaining waveform equalizing processes in the decision feedback equalization circuit.
Figure 3:
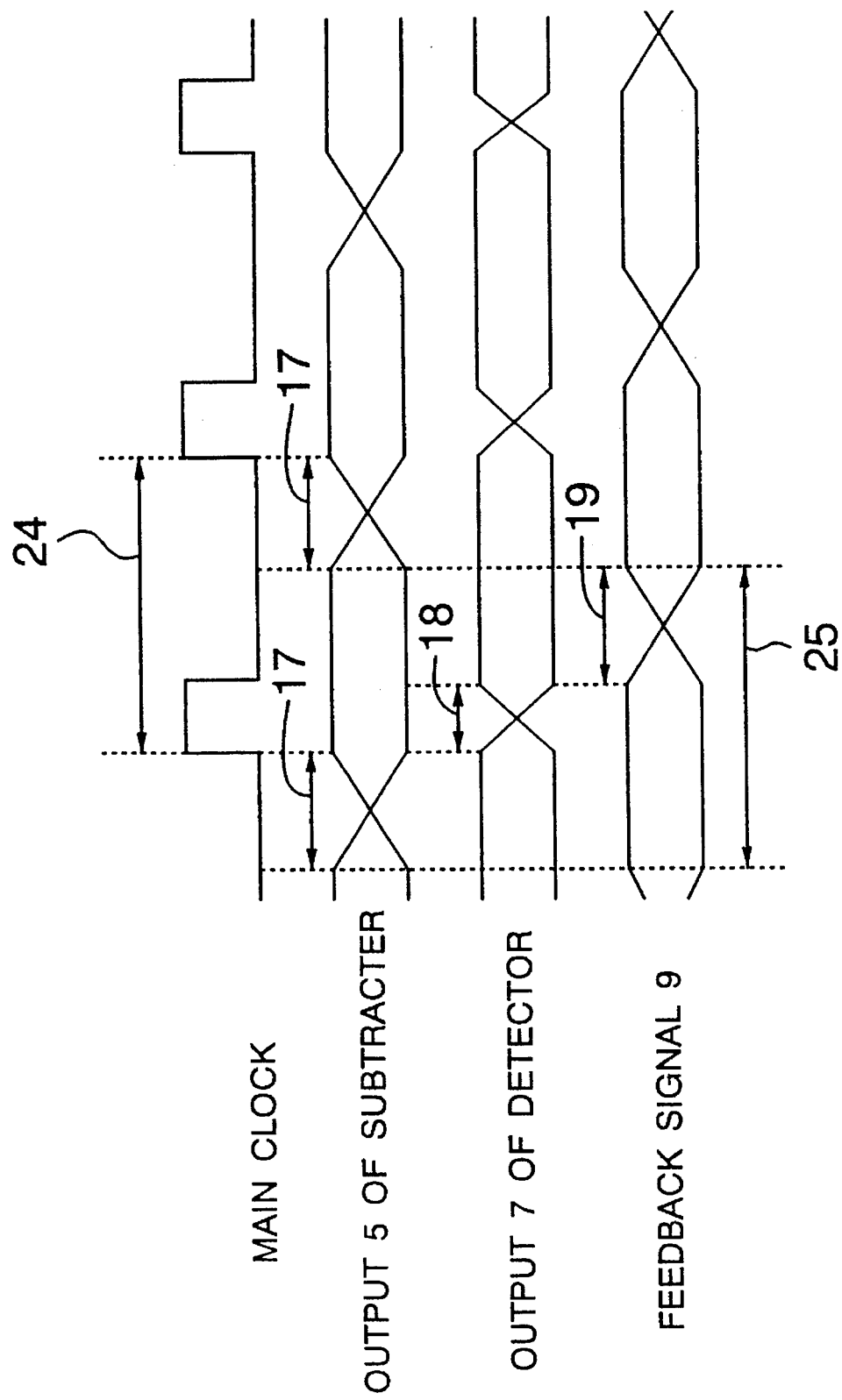
FIG. 3 is an operational timing chart for explaining the operation of the prior art decision feedback equalization circuit.
Figure 4:
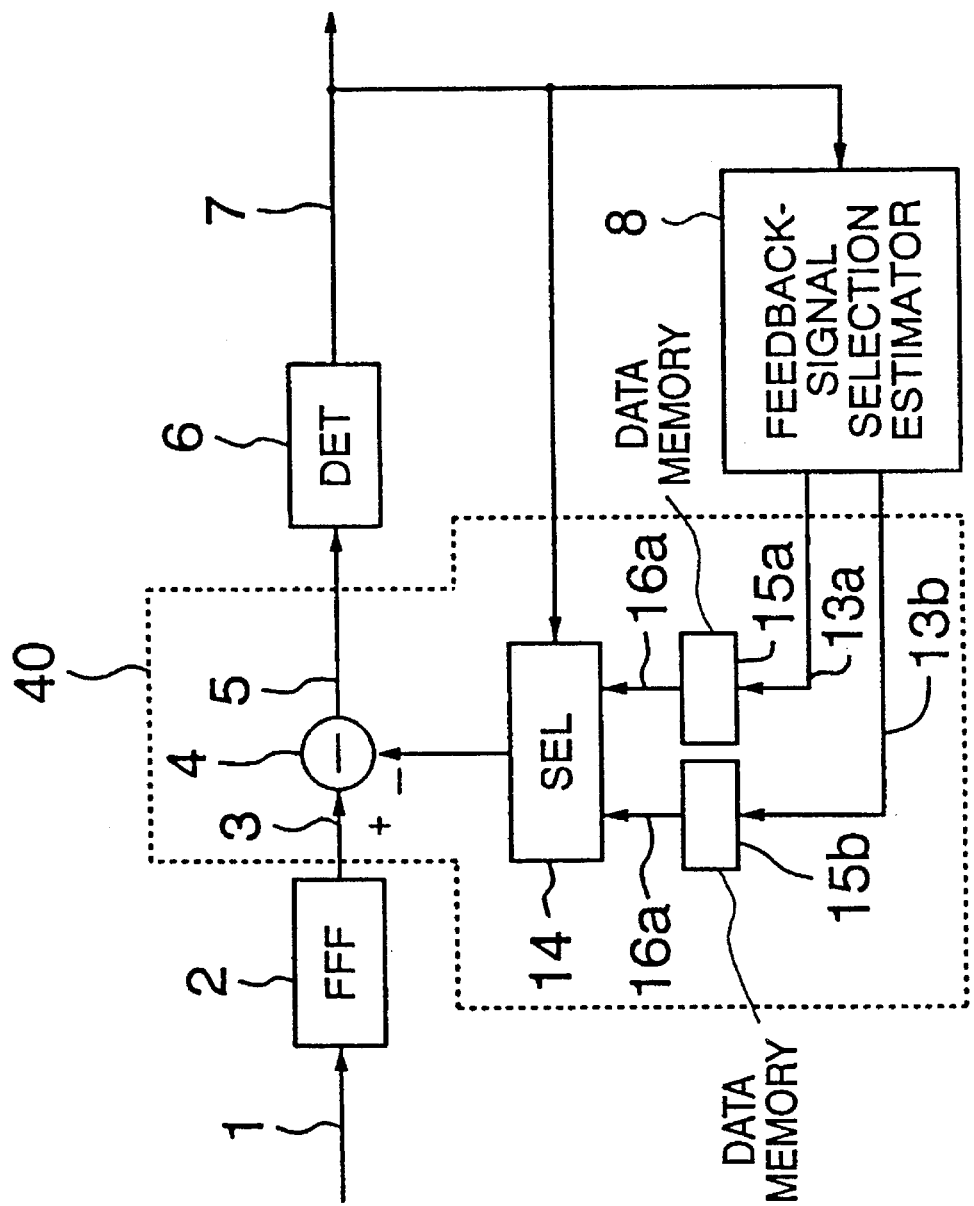
FIG. 4 is a diagram for explaining the first embodiment of the present invention.

A first embodiment of the present invention will be explained with reference to the accompanying drawings. As shown in FIG. 4, the present embodiment comprises a linear equalizer 2, a subtracter 4, a detector 6, an estimator 8 for selection of feedback signal, data memories 15a and 15b, and a selector 14. In the present embodiment, to simplify the following account, it is assumed that a received signal 1 corresponds to a binary signal of levels of "0" and "1" distorted by intersymbol interference and other disturbance.

Explanation will be made as to the operation of decision feedback equalization circuit of the present embodiment by referring to FIG. 4. The received signal 1 is input to the linear equalizer 2. In the linear equalizer 2, the input signal is subjected to removal of forward interference. An output 3 of the linear equalizer 2 is applied to an plus input of the subtracter 4. The subtracter 4 acts to subtract a feedback signal 9 from the output 3 of the linear equalizer 2. An output 5 of the subtracter 4 is sent to the detector 6 which in turn performs its detecting operation of "0" or "1" over the input signal. An output 7 of the detector 6, which becomes a final output of the decision feedback equalization circuit, is also applied to the estimator 8 for selection of feedback signal candidates and to the selector 14. The selector 14 has 3 inputs, 2 of which receive to-be-selected signals and the remaining one of which receives a selection control signal. The selector 14 selects and determines as its output either one of the to-be-selected signals on the basis of the state "0" or "1" of the selection control signal. In the illustrated example, the output 7 of the detector 6 is used as the selection control signal while outputs of the data memories 15a and 15b are used as the to-be-selected signals. When the selector 14 holds as feedback signal selections or candidates a feedback signal 13a when determining "0" as its decision result and a feedback signal 13b when determining "1" as its decision result, it selects and outputs one of the feedback signal candidates corresponding to the actually obtained decision result. Meanwhile, the estimator 8 for selection of feedback signal candidates generates the feedback signal 13a when the selector 14 determines "0" and the feedback signal 13b when the selector 14 determines "1". The above operations are repeated.

In FIG. 4, reference numeral 40 denotes a part which functions to executing a function of receiving the output of the linear equalizer 2 and the outputs of the estimator 8 for selection of feedback signal candidates to obtain a decision result for the received signal at a predetermined time.

Figure 5:
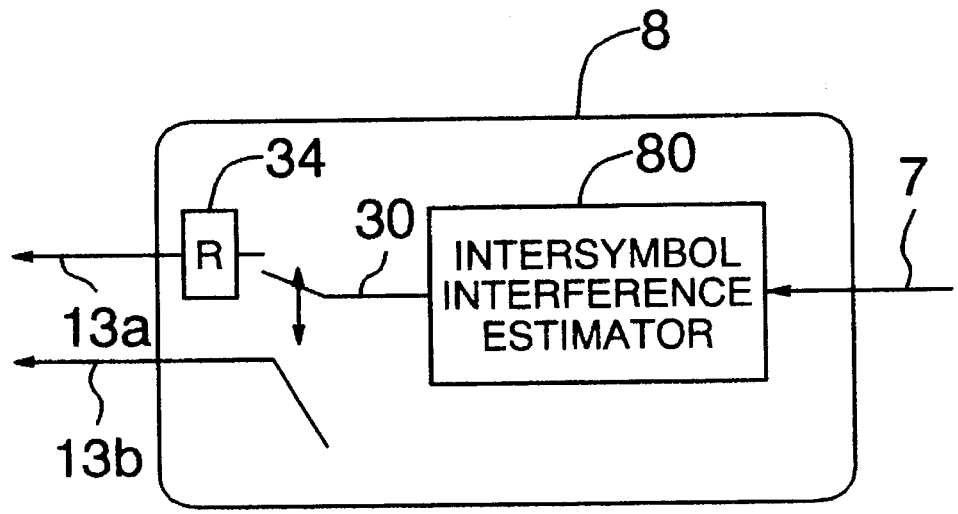
FIG. 5 is a diagram for explaining a first example of a feedback-signal selection estimator in first and second embodiments of the present invention.

The estimator 8 for selection of feedback signal candidates in the present embodiment may comprise such a single estimator 80 for intersymbol interference as shown in FIG. 5. In this case, the intersymbol interference estimator 80 generates an intersymbol interference when the selector 14 determines "0" as its decision result and the decision result "0" is held in a second data memory 34, and subsequently generates an intersymbol interference when the selector 14 determines "1" as its decision result. In this way, such an arrangement as to use the single intersymbol interference estimator can realize a high speed operation while eliminating the need for increasing the number of circuit elements to a large extent.

Figure 7:
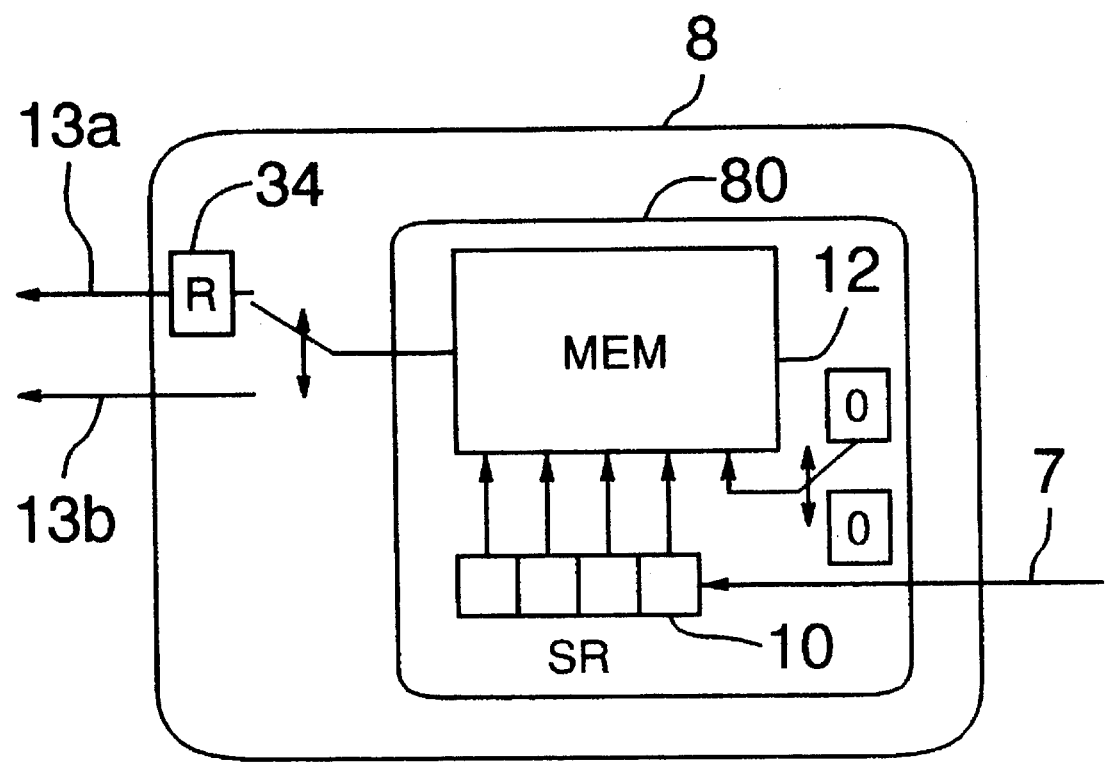
FIG. 7 is a diagram for explaining a third example of the feedback-signal selection estimator in first and second embodiments of the present invention.

In such an embodiment having the estimator 8 for selection of feedback signal candidates made up of the single intersymbol interference estimator as mentioned above, the intersymbol interference estimator 80 may comprise a shift register 10 for holding therein a history of decision results and a data memory 12 using respective bits of the shift register as its addresses, as shown in FIG. 7. Such an arrangement as to use the above memory can eliminate interference dependent on recording pattern.

Figure 11:
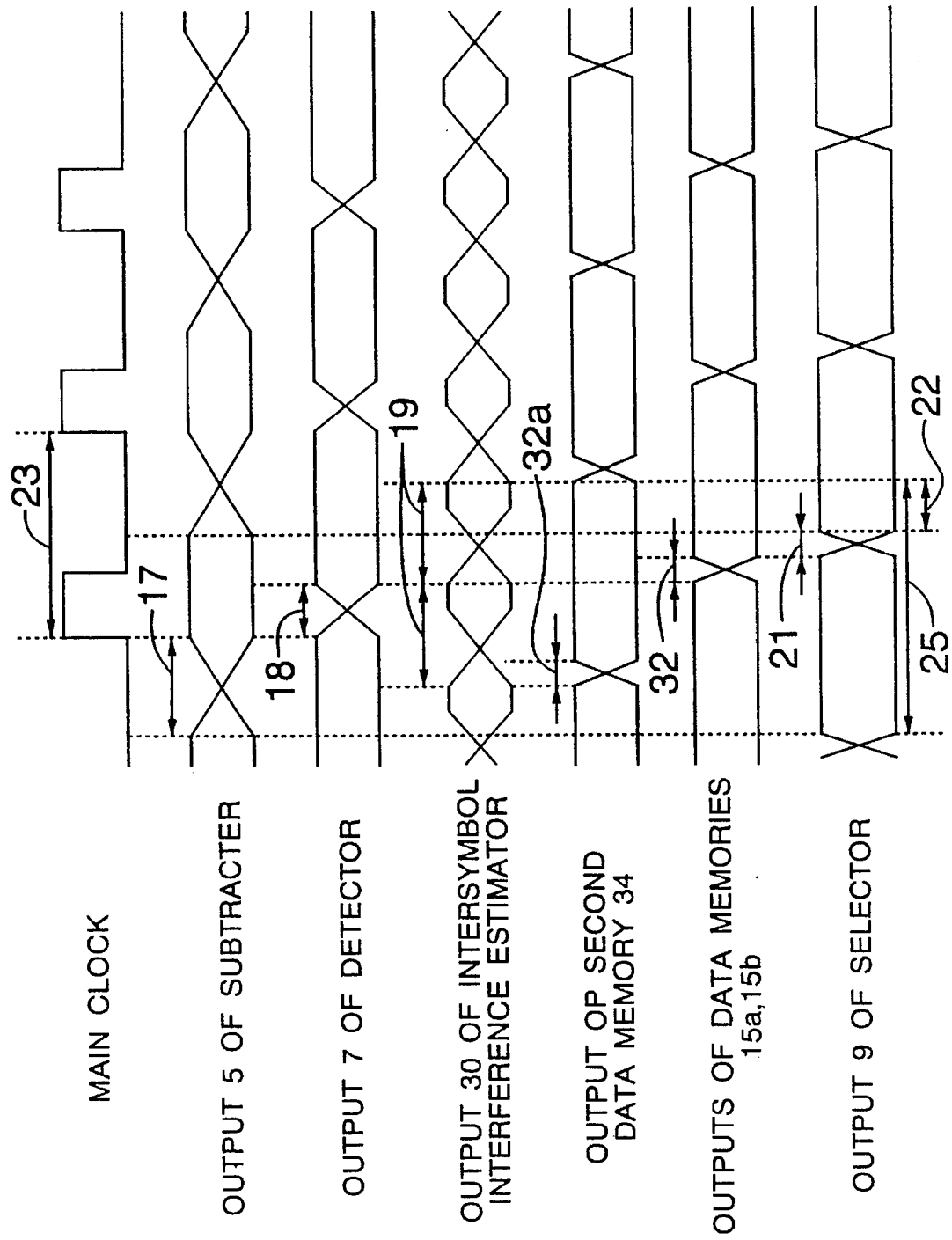
FIG. 11 is a timing chart for explaining the operation of the first embodiment of the present invention in which the example of FIG. 5 or 7 is employed for the feedback-signal selection estimator.

Shown in FIG. 11 is a timing chart for explaining the operation of the aforementioned embodiment including the estimator 8 for selection of feedback signal candidates made up of the single intersymbol interference estimator.

Figure 6:
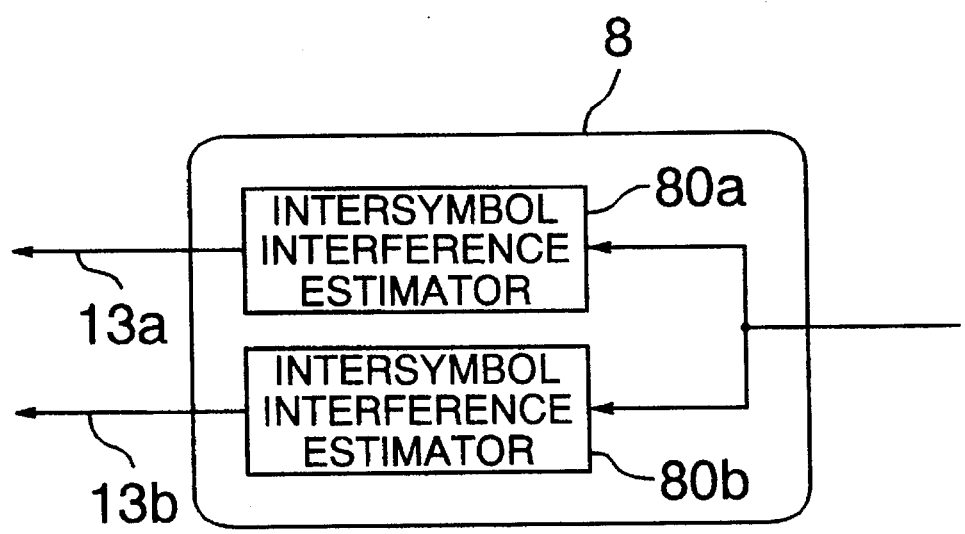
FIG. 6 is a diagram for explaining a second example of the feedback-signal selection estimator in first and second embodiments of the present invention.

The estimator 8 for selection of feedback signal candidates in the present embodiment may comprise 2 intersymbol interference estimators 80a and 80b as shown in FIG. 6. In this case, the 2 intersymbol interference estimators simultaneously generate an intersymbol interference at the time of the first decision result and an intersymbol interference at the time of the next decision result ("0" or "1" in the present embodiment). In this way, such an arrangement using the 2 intersymbol interference estimators can realize a higher speed operation than in the arrangement using the single intersymbol interference estimator.

Figure 8:
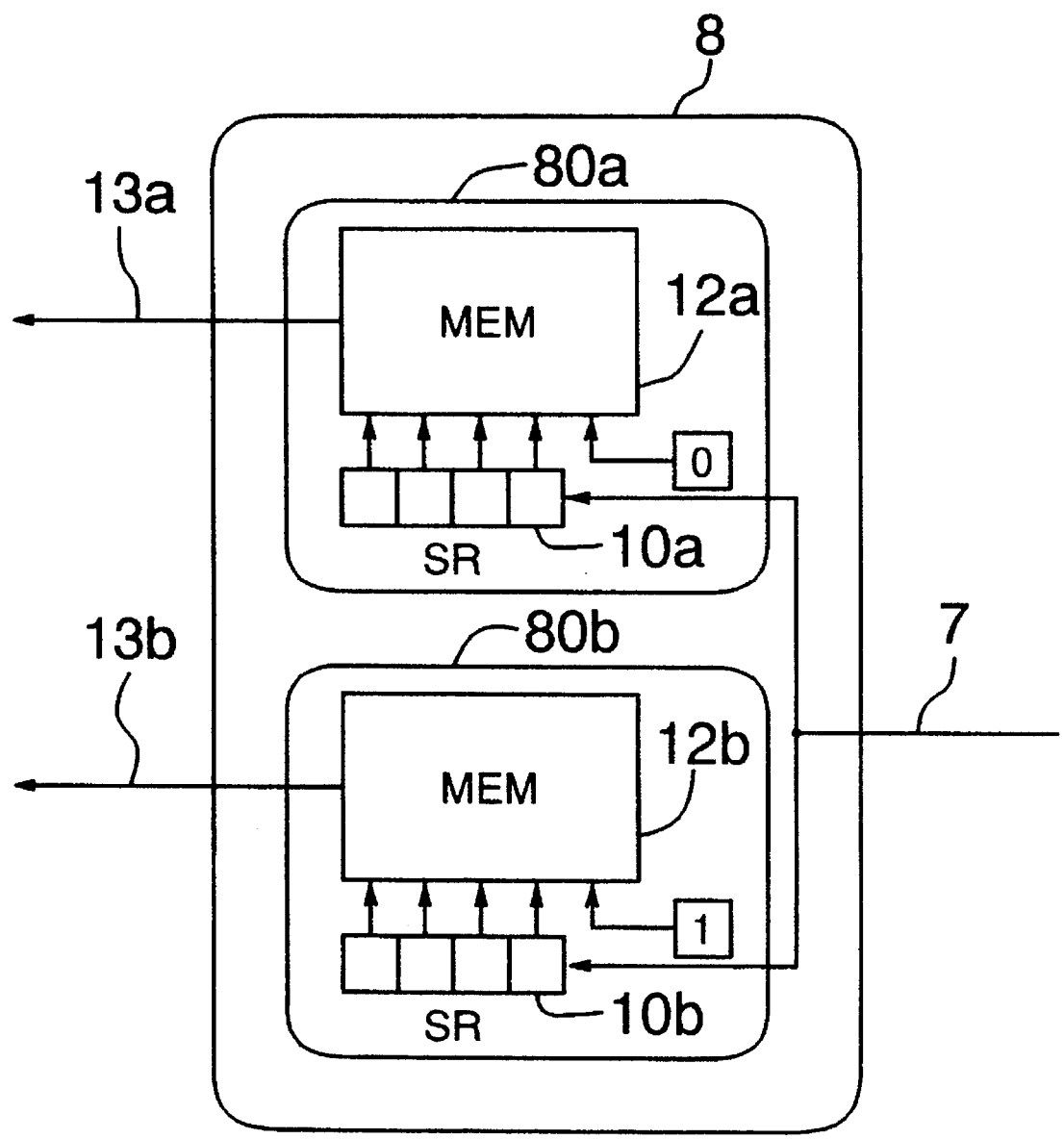
FIG. 8 is a diagram for explaining a fourth example of the feedback-signal selection estimator in first and second embodiments of the present invention.

In the aforementioned embodiment having the feedback-signal selection estimator 8 made up of the 2 intersymbol interference estimators, the intersymbol interference estimators 80a and 80b may comprise shift registers 10a and 10b for holding therein a history of decision results and data memories 12a and 12b using respective bits of the shift registers as their addresses respectively, as shown in FIG. 8. The arrangement using such memories can remove interference dependent on recording pattern.

Figure 10:
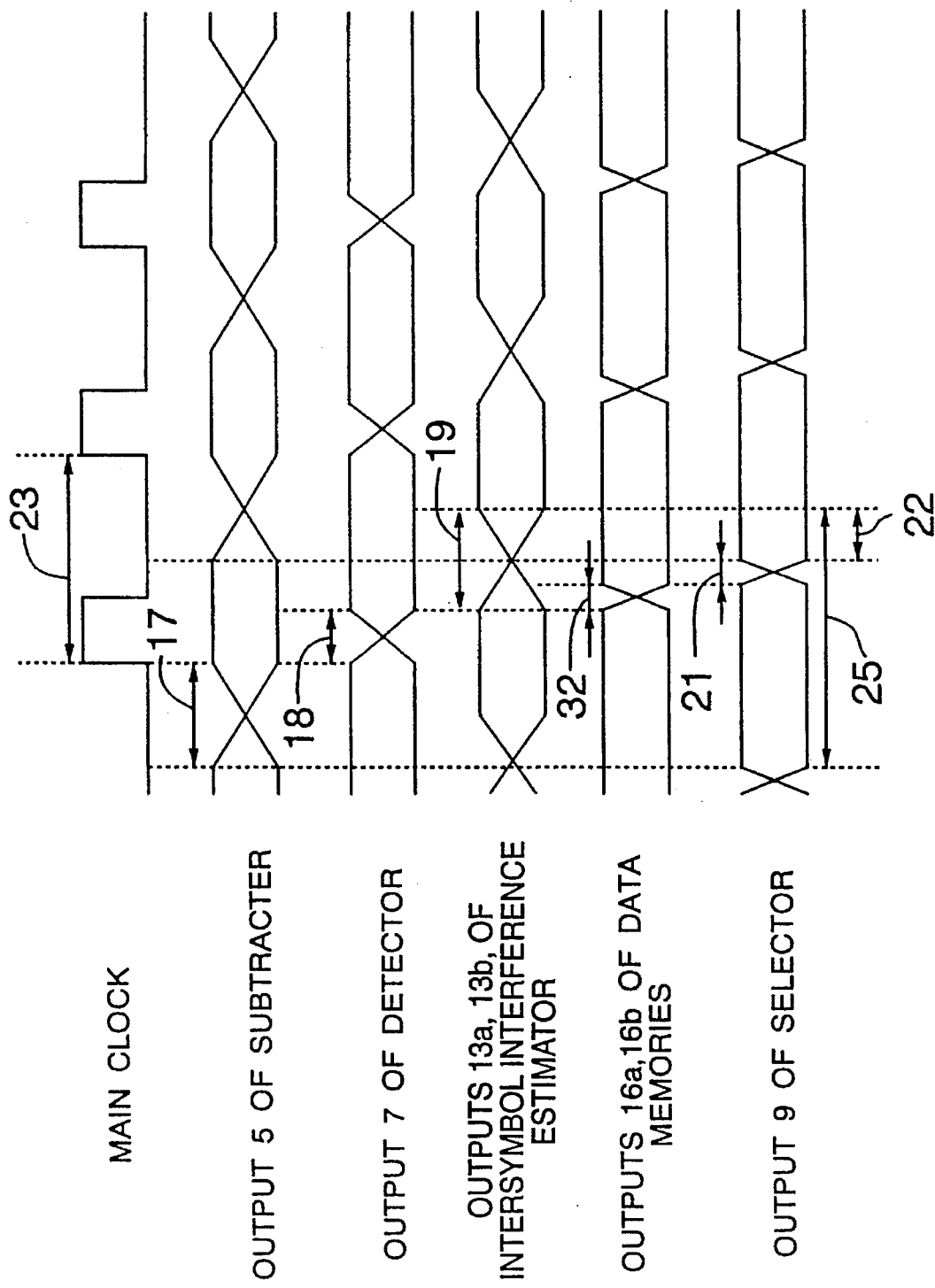
FIG. 10 is a timing chart for explaining the operation of the first embodiment of the present invention in which the example of FIG. 6, 8 or 9 is employed for the feedback-signal selection estimator.

FIG. 10 shows a timing chart for explaining the operation of the above embodiment having the feedback-signal selection estimator 8 made up of the 2 intersymbol interference estimators. In the present embodiment, a main clock period in the present invention can be made shorter than a main clock period in the prior art, by a time 22 corresponding to a subtraction of a delay time 32 of the data memories and a delay time 21 of the selector from a delay time 19 of the intersymbol interference estimators 80a and 80b.

Figure 9:
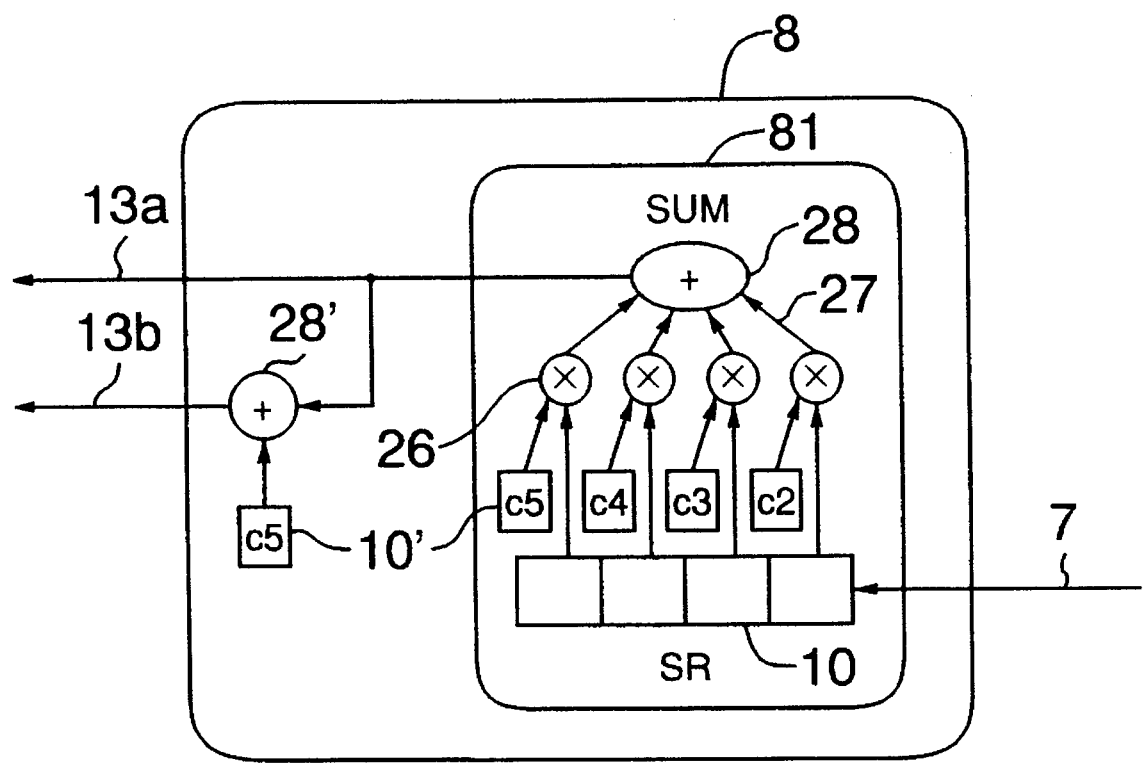
FIG. 9 is a diagram for explaining a fifth example of the feedback-signal selection estimator in first and second embodiments of the present invention.

The feedback-signal selection estimator 8 in the present embodiment may comprise, as shown in FIG. 9, a shift register 10 for holding therein a history of decision results, coefficient memories 10' for holding therein coefficients to be multiplied by values held in respective bits of the shift register, multipliers 26 for performing multiplication of the values held in the shift register and the coefficients held in the coefficient memories, a first adder 28 for calculating a sum of outputs of the respective multipliers, and a second adder 28' for adding a coefficient to an output of the first adder 28 to obtain a feedback signal candidate when the next decision result is "1". The timing of the then operation is also shown in FIG. 10. In the present embodiment, a main clock period in the present invention can be made shorter than a main clock period in the prior art, by a time 22 corresponding to a subtraction of a delay time 32 of the data memories and a delay time 21 of the selector from a delay time 19 of an intersymbol interference estimator 81.

Figure 12:
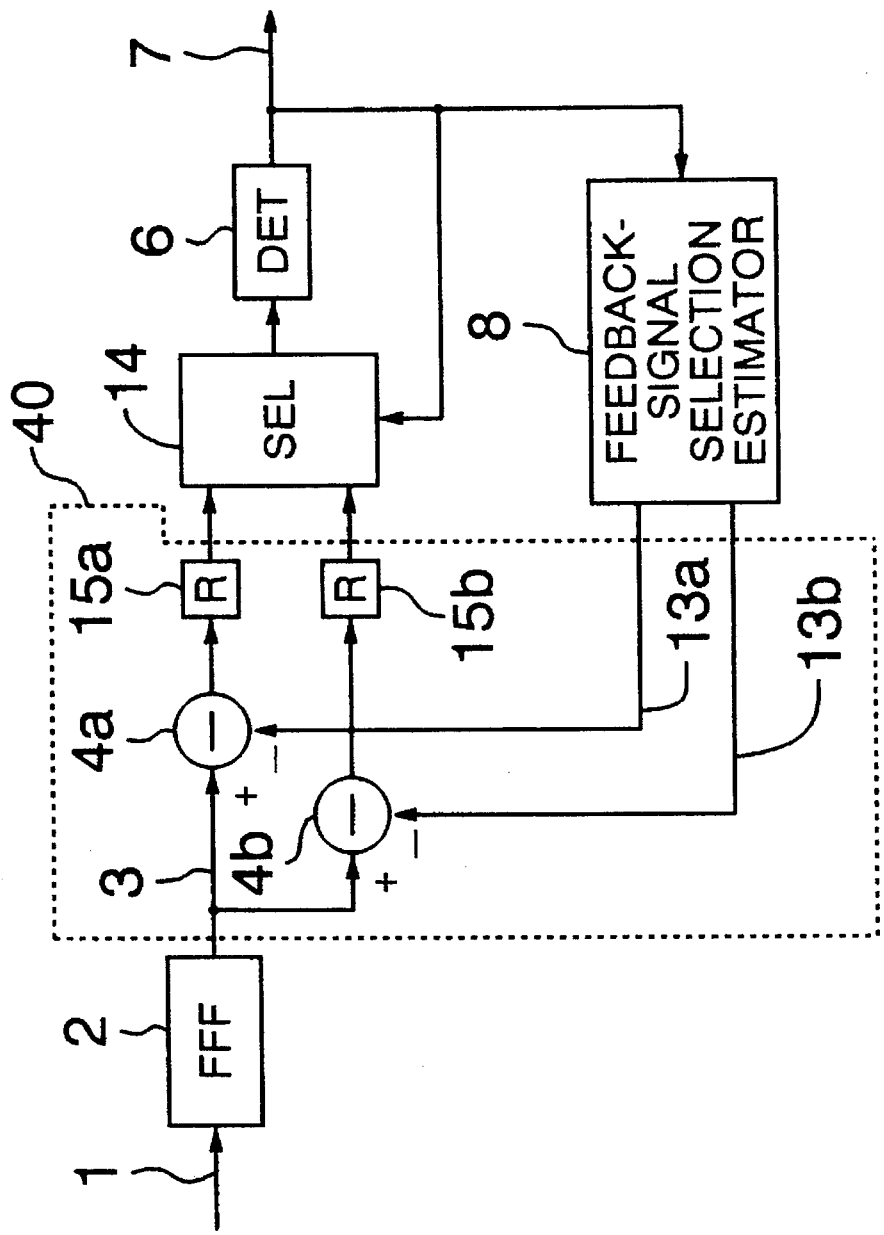
FIG. 12 is a diagram for explaining the second embodiment of the present invention.

Another embodiment of the present invention will be explained by referring mainly to FIGS. 12 to 14. The present embodiment comprises a linear equalizer 2, subtracters 4a and 4b, a detector 6, a feedback-signal selection estimator 8, data memories 15a and 15b, and a selector 14. A received signal in the present embodiment is assumed to be similar to that in the first embodiment.

The operation of a decision feedback equalization circuit of the present embodiment will be explained with reference to FIG. 12. A received signal 1 is applied to the linear equalizer 2. The linear equalizer 2 eliminates forward interference from the received signal. An output 3 of the linear equalizer 2 is applied to plus inputs of the subtracters 4a and 4b. The subtracters 4a and 4b subtract feedback signal candidates 13a and 13b from the output 3 of the linear equalizer 2 respectively. The feedback signal candidates 13a and 13b are feedback signals when the decision results are "0" and "1" respectively. Outputs of the subtracters 4a and 4b are applied to respective data memories 15a and 15b. Outputs of the data memories 15a and 15b are applied to the selector 14. The selector 14 issues an output of the data memory 15a when a decision result 7 is "0" and issues an output of the data memory 15b when the decision result is "1". The selector 14 sends its output to the detector 6. The detector 6 decides whether the decision result is "0" or "1". An output of the detector 6, which is the final output of the decision feedback equalization circuit, is also applied to the feedback-signal selection estimator 8 and the selector 14. The feedback-signal selection estimator 8 generates the feedback signal 13a when the decision result is "0" and the feedback signal 13b when the next decision result is "1", and applies these feedback signals 13a and 13b to minus inputs of the respective subtracters 4a and 4b.

In the case where such an arrangement is employed, when one of the outputs of the subtracters 4a and 4b is determined to be much apart from an expected value through the comparison between the outputs of the subtracters 4a and 4b, the other output can be selected regardless of the decision result to improve reliability in the decision.

The feedback-signal selection estimator 8 in the present embodiment may comprise such a single intersymbol interference estimator 80 as shown in FIG. 5. In this case, the intersymbol interference estimator 80 generates an intersymbol interference when the next decision result is "0" and the generated intersymbol interference is held in the second data memory 34; while the intersymbol interference estimator 80 generates an intersymbol interference when the next decision result is "1". In this way, the above arrangement using the single intersymbol interference estimator can realize a high speed operation while eliminating the need for increasing the number of circuit elements to a large extent.

In the foregoing embodiment having the feedback-signal selection estimator 8 formed as the single intersymbol interference estimator, the intersymbol interference estimator 80 may comprise a shift register 10 for holding a history of decision results and data memory 12 using respective bits of the shift register as its addresses, as shown in FIG. 7. The arrangement using such a memory can remove interference dependent on recording pattern.

Figure 13:
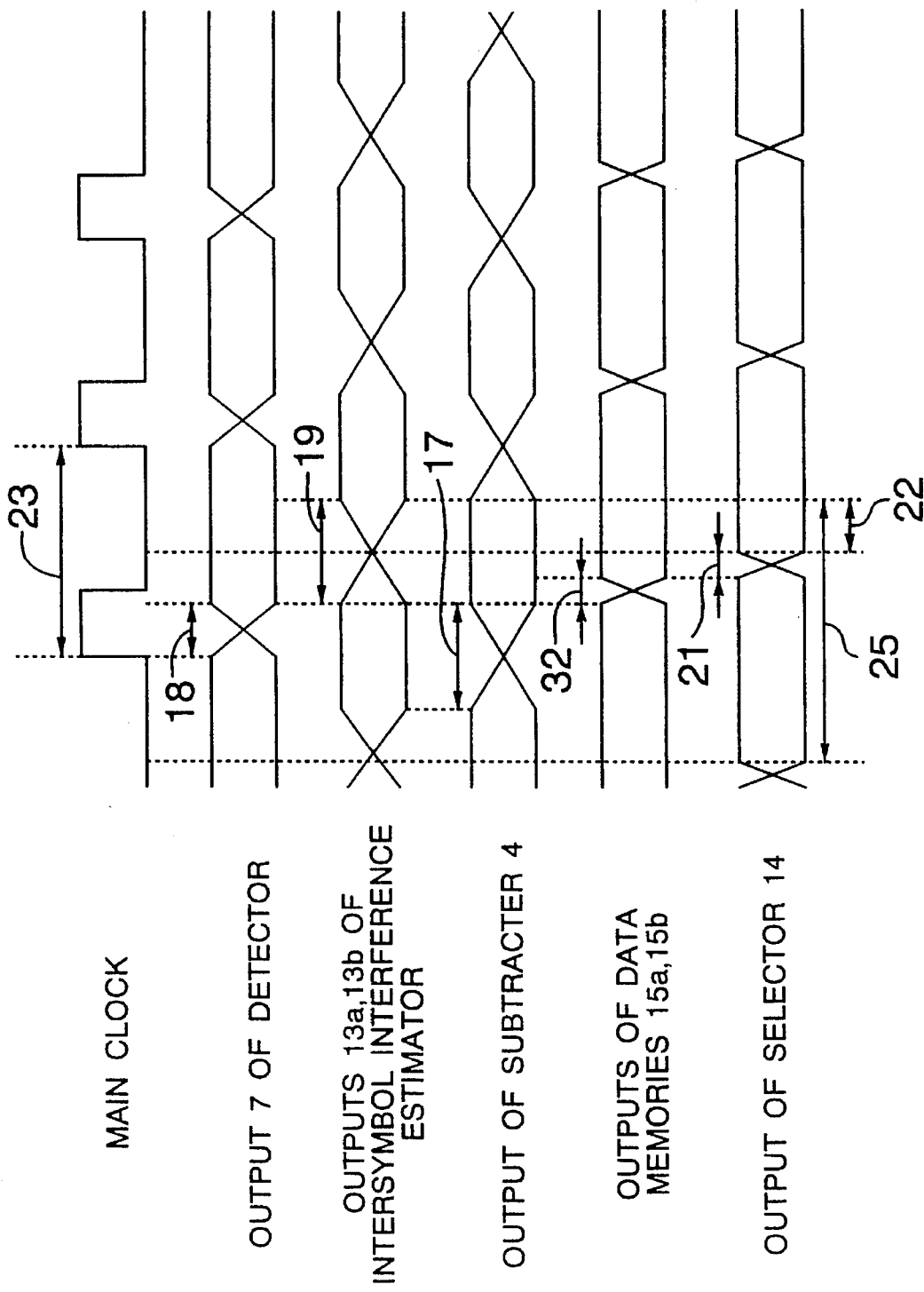
FIG. 13 is a timing chart for explaining the operation of the second embodiment of the present invention in which the example of FIG. 6, 8 or 9 is employed for the feedback-signal selection estimator.

Shown in FIG. 13 is a timing chart for explaining the operation of the above embodiment having the feedback-signal selection estimator 8 formed as the single intersymbol interference estimator.

The feedback-signal selection estimator 8 in the present embodiment may comprise 2 intersymbol interference estimators 80a and 80b as shown in FIG. 6. In this case, the 2 intersymbol interference estimators simultaneously generate an intersymbol interference at the time of the first decision result and an intersymbol interference at the time of the next decision result ("0" or "1" in the present embodiment). In this way, such an arrangement using the 2 intersymbol interference estimators can realize a higher speed operation than in the arrangement using the single intersymbol interference estimator.

In the aforementioned embodiment having the feedback-signal selection estimator 8 made up of the 2 intersymbol interference estimators, the intersymbol interference estimators 80a and 80b may comprise shift registers 10a and 10b for holding therein a history of decision results and data memories 12a and 12b using respective bits of the shift registers as their addresses respectively, as shown in FIG. 8. The arrangement using such memories can remove interference dependent on recording pattern.

Figure 14:
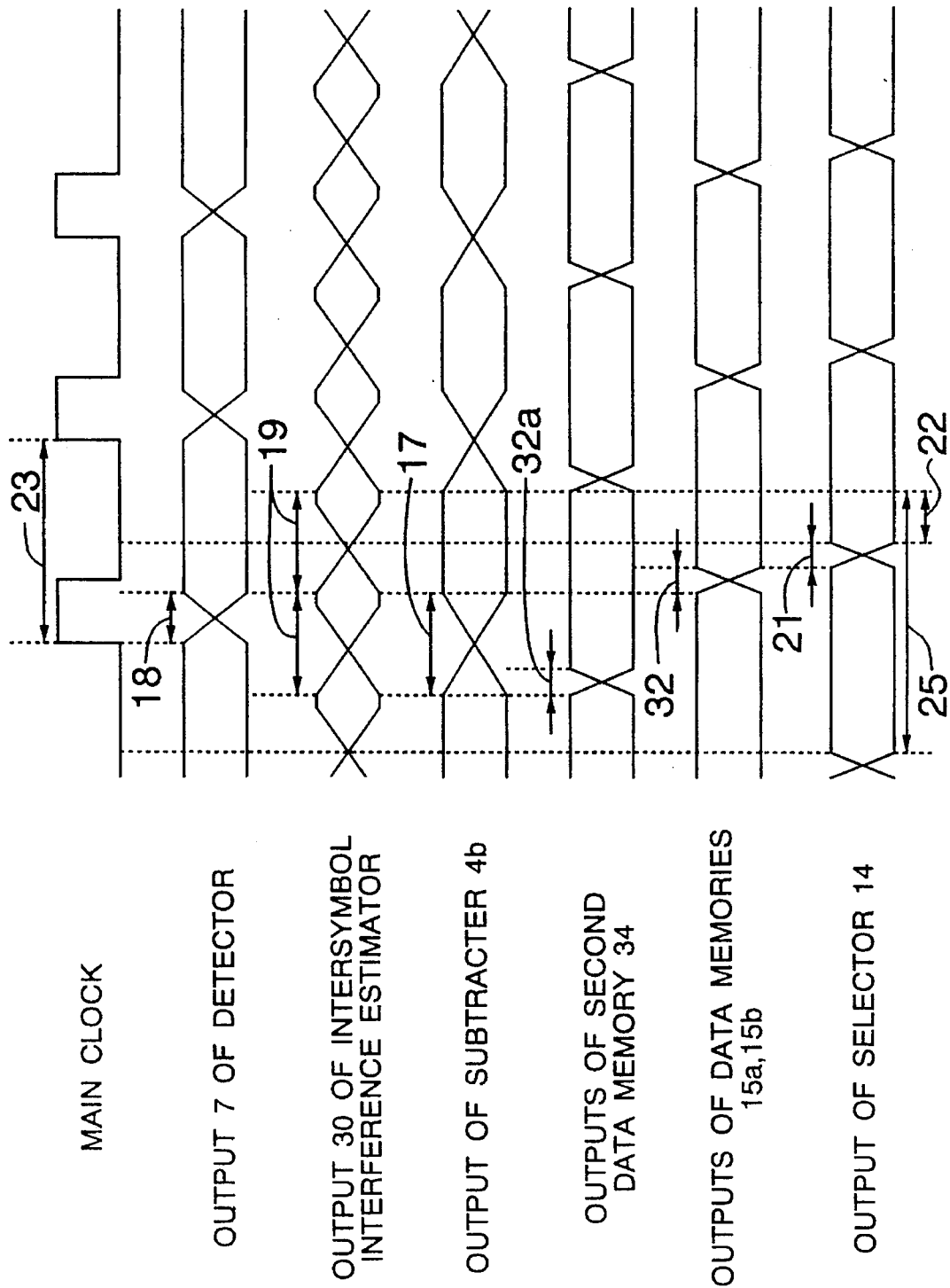
FIG. 14 is a timing chart for explaining the operation of the second embodiment of the present invention in which the example of FIG. 5 or 7 is employed for the feedback-signal selection estimator.

FIG. 14 shows a timing chart for explaining the operation of the above embodiment having the feedback-signal selection estimator 8 made up of the 2 intersymbol interference estimators. In the present embodiment, a main clock period in the present invention can be made shorter than a main clock period in the prior art, by a time 22 corresponding to a subtraction of a delay time 32 of the data memories and a delay time 21 of the selector from a delay time 19 of the intersymbol interference estimators 80a and 80b.

The feedback-signal selection estimator 8 in the present embodiment may comprise, as shown in FIG. 9, a shift register 10 for holding therein a history of decision results, coefficient memories 10' for holding therein coefficients to be multiplied by values held in respective bits of the shift register, multipliers 26 for performing multiplication of the values held in the shift register and the coefficients held in the coefficient memories, a first adder 28 for calculating a sum of outputs of the respective multipliers, and a second adder 28' for adding a coefficient to an output of the first adder 28 to obtain a feedback signal candidate when the next decision result is "1". The timing of the then operation is also shown in FIG. 14. In the present embodiment, a main clock period in the present invention can be made shorter than a main clock period in the prior art, by a time 22 corresponding to a subtraction of a delay time 32 of the data memories and a delay time 21 of the selector from a delay time 19 of an intersymbol interference estimator 81.

In the first and second embodiments of the present invention, the detector may perform its detecting or deciding operation with use of a plurality of bits of information. The operational principle of such a detector as to be able to perform its deciding operation on a plurality of bits of information will be explained in connection with FIGS. 15 to 18. For the purpose of simplifying the explanation, explanation will be made as to the case where such a detector performs its deciding operation with use of information on a bit to be decided and on a successive bit at a next time (which detector will be referred to as the 2-bit detector, hereinafter) is used in the first embodiment of the present invention. A decision feedback equalizer using such a 2-bit detector is described, for example, in J. Moon and L. R. Carley, "Performance comparison of detection methods in magnetic recording", IEEE Trans. Magn. Vol. 26, No. 6, pp. 3155–3172, November 1990.

Figure 15:
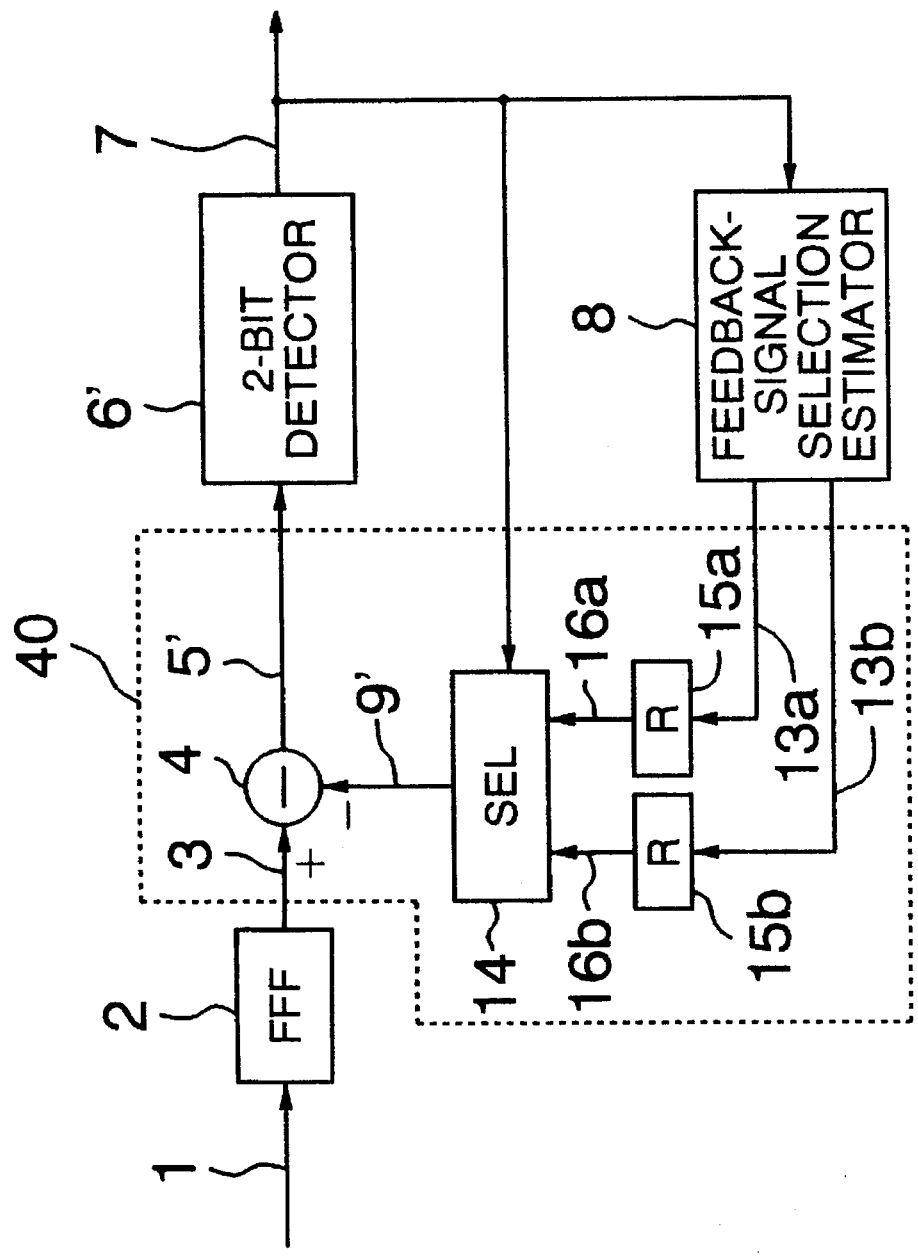
FIG. 15 is a block diagram of the first embodiment of the present invention in which a 2-bit detector is used.

FIG. 15 shows a block diagram of an embodiment of the present invention in which a 2-bit detector 6' is used in the first embodiment.

Figure 16:
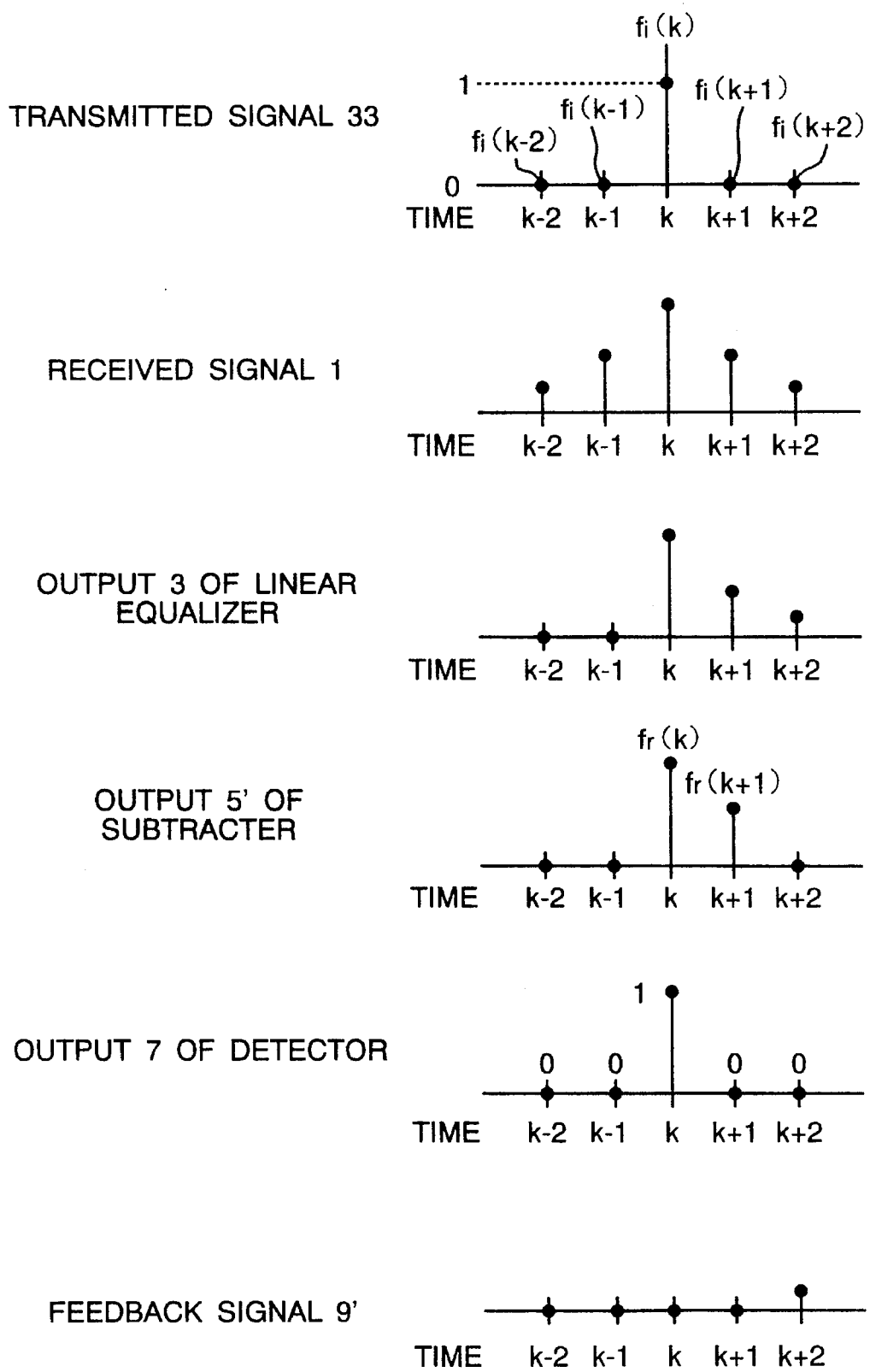
FIG. 16 shows diagrams for explaining the operation of the first embodiment of the present invention in which the 2-bit detector is used.

FIG. 16 shows diagrams for explaining the operation of the embodiment of the present invention in which the 2-bit detector 6' is used in the first embodiment. For the sake of the convenience of explanation, it is assumed here that delay times of elements in a circuit of FIG. 15 are sufficiently small and negligible. A transmitted signal 33 is an isolated impulse signal which takes a level "1" at a time k and a level "0" at the other times; whereas the received signal 1 received through a channel has such a spread that each 2 bits are present after and before a peak value corresponding to the transmitted signal 33 of "1", which results in an intersymbol interference. The linear equalizer 2 can eliminate a forward interference from the intersymbol interference. The output 3 of the linear equalizer 2 is subtracted at the subtracter 4 by a feedback signal 9'. The 2-bit detector 6', when detecting or deciding a signal at the time k, utilizes the signal at a next time k+1 containing interference from the signal at the time k. The 2-bit detector 6', with use of these 2 bits, decides that the signal at the time k has a level "1" and eliminates the intersymbol interference contained by the signal "1" at the time k from the signal at the next time k+1 to thereby obtain an output 7.

Explanation will then be made as to the detecting or deciding principle of the 2-bit detector 6' by referring to FIGS. 15 to 17. An output 5' of the subtracter is applied to the 2-bit detector 6'. The then output is assumed to have levels of fr(k) and fr(k+1) at times k and k+1 as transmitted signals fr(k) and fr(k+1). The transmitted signals fr(k) and fr(k+1) have only 4 combinations of (0,0), (0,1), (1,0) and (1,1). Hence, ideal received signals f0,0; f0,1; f1,0; and f1,1 without noise are prepared for the 4 combinations of the transmitted signals, and a square error E is calculated using these signals in accordance with the following equation.

$$E=\{fm,n(k)-fr(k)\}2+\{fm,n(k+1)-fr(k+1)\}2$$

where, m=0,1 and n=0,1.

Figure 18:
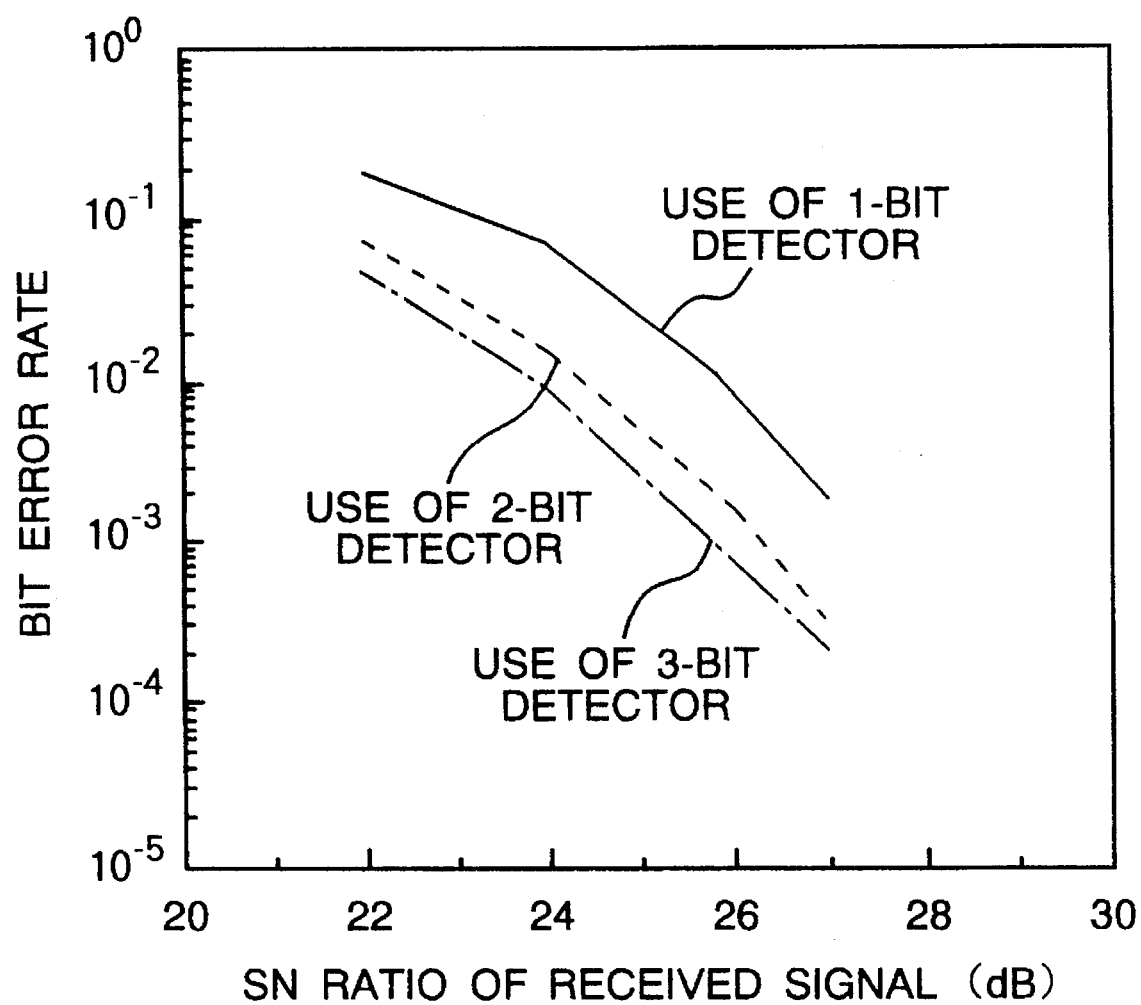
FIG. 18 is a graph showing a bit error rate reduction effect when a plural-bit detector is used in the first embodiment of the present invention.

In the illustrated example, since the error becomes smallest for f1, 0, the 2-bit detector 6' decides that fr(k) has "1" and subtraction of f1,0(k+1) is carried out for fr(k+1) and later. When decision is carried out by the 2-bit detector in this way, error becomes much less than the 1-bit decision case. Similarly, the more the number of bits is increased the less the error occurs, as shown in the example given in FIG. 18. FIG. 18 shows comparative results of bit error rate when the detector utilizes 1-, 2- and 3-bits. The "bit error rate", which represents a rate of bits at which an error occurs on an average, is expressed in the ordinate; while a signal-to-noise ratio (SN ratio) for the received signal is expressed in the abscissa. It will be seen from FIG. 18 that the more the number of bits used in the decision is increased the more the bit error rate is decreased.

Even when such a detector for performing decision with use of information on a plurality of bits is used in the second embodiment of the present invention, the effect of reducing the bit error rate is also as shown in FIG. 18.

Likewise, the operational timing, for when such a detector with use of information on a plurality of bits is used in the first and second embodiments of the invention, is also similar to the case of using the 1-bit detector.

In accordance with the present invention, the operation of the decision feedback equalization circuit can be made fast with a low cost.

What is claimed is:

1. A decision feedback equalization circuit for eliminating intersymbol interference from a received signal sequence, comprising:

first equalizer means for removing forward interference at a time antecedent to a time t in said received signal sequence;

second equalizer means for removing backward interference at a time subsequent to the time t in said received signal sequence;

detector means for receiving a signal sequence subjected to removal of the intersymbol interference by said first equalizer means and said second equalizer means and outputting a decision result for a signal value at the time t; and estimation means, prior to obtaining the decision result for the input signal value at the time t from the detector means, for outputting a plurality of candidate values of the backward interference estimated to be contained in an output signal of said first equalizer means at a time t+1 by using signal values of the output decision results of said detector means up to a time t−1;

wherein said second equalizer means includes selector means for selecting one of said plurality of candidate values as the backward interference to be removed from the received signal sequence in accordance with the decision result output of said detector means at the time t.

2. A decision feedback equalization circuit as set forth in claim 1, wherein said second equalizer means includes memory means for storing therein a plurality of output values of said estimation means, one of the contents of which is selected by said selector means according to the output result of said detector means, and means for subtracting an output of said selector means from the output result of said first equalizer means and supplying a subtraction result to said detector means.

3. A decision feedback equalization circuit as set forth in claim 1, wherein said estimation means includes register memory means for holding therein a series of signal values supplied as the output results of said detector means up to the time t−1 and a data memory means for storing therein a plurality of sets of candidate values of the backward interference, said data memory means being accessed by using contents of said register memory means as at least a part of a read address, thereby to deliver a set of candidate values of the backward interference from said data memory means as an output of said estimation means.

4. A decision feedback equalization circuit as set forth in claim 3, wherein said estimation means has a plurality of sets of said register memory means and said data memory means each prepared in corresponding to one of possible signal values of said decision results at the time t, each of said data memory means delivering one of said set of candidate values in parallel with each other as the output of said estimation means.

5. A decision feedback equalization circuit as set forth in claim 1, wherein said detector means performs its detecting operation with use of information at the time t as detection target and information at the next time t−1.

6. A decision feedback equalization circuit as set forth in claim 4, wherein said detector means performs its detecting operation with use of information at the time t as detection target and information at the next time t−1.

7. A decision feedback equalization circuit as set forth in claim 1, wherein said estimation means includes register memory means for storing therein a series of bit values supplied as the output results of said detector means up to the time t−1, coefficient memory means for storing therein coefficients to be multiplied by respective bit values stored in said register memory means, and means for performing multiplication of the bit values stored in said register memory means and said corresponding coefficients and for calculating a sum of results of said multiplication.

8. A decision feedback equalization circuit as set forth in claim 1, wherein said estimation means includes register memory means for storing therein a series of bit values supplied as the output results of said detector means up to the time t−1, coefficient memory means for holding therein coefficients to be multiplied by respective bit values stored in said register memory means, a plurality of multipliers for performing multiplication of the bit values and said corresponding coefficients, and an adder for calculating a sum of respective outputs of said plurality of multipliers.

9. A decision feedback equalization circuit for eliminating intersymbol interference from a received signal sequence, comprising:

first equalizer means for removing forward interference at a time antecedent to a time t in said received signal sequence;

second equalizer means for removing backward interference at a time subsequent to the time t in said received signal sequence;

detector means for receiving a signal sequence subjected to removal of the intersymbol interference by said first and second equalizer means and for outputting a decision result for a signal value at the time t; and estimation means for outputting a plurality of candidate values of the backward interference to be used at time t+1 said candidate values being determined depending upon a series of signal values of the decision result outputted from said detector means up to time t+1;

wherein said second equalizer means includes a plurality of subtraction means for subtracting said respective candidate values of said backward interference from the output of said first equalizer means, and selector means for selecting one of output signals of said plurality of subtraction means according to the decision result of said detector means for the signal value at the time t and supplying the selected output signals to said detector means.

10. A decision feedback equalization circuit as set forth in claim 9, wherein said second equalizer means includes a plurality of latch memory means for storing therein output values of said subtraction means, respectively, and the selector means selectively outputting one of the contents of said plurality of latch memory means according to the decision result of said detector means.

11. A decision feedback equalization circuit as set forth in claim 9, wherein said estimation means includes register memory means for holding therein a series of signal values supplied as the output results of said detector means up to the time t−1 and a data memory means for storing therein a plurality of sets of candidate values of the backward interference, said data memory means being accessed by using contents of said register memory means as at least a part of a read address, thereby to deliver a set of candidate values of the backward interference from said data memory means as an output of said estimation means.

12. A decision feedback equalization circuit as set forth in claim 11, wherein said estimation means has a plurality of sets of said register memory means and said data memory means prepared corresponding to possible signal values of said decision results at the time t, each of said data memory means delivering one of said set of candidate values in parallel with each other as outputs of said estimation means.

13. A decision feedback equalization circuit as set forth in claim 9, wherein said detector means performs its detecting operation with use of information at the time t as a decision target and information at the next time t−1.

14. A decision feedback equalization circuit as set forth in claim 9, wherein said estimation means includes register memory means for storing therein a series of bit values supplied as the output results of said detector means up to the time t−1, coefficient memory means for storing therein coefficients to be multiplied by respective bit values stored in said register memory means, and means for performing multiplication of the bit value stored in said register memory means and said corresponding coefficients and for calculating a sum of results of said multiplication.

* * * * *